United States Patent Office 3,423,667
Patented Jan. 21, 1969

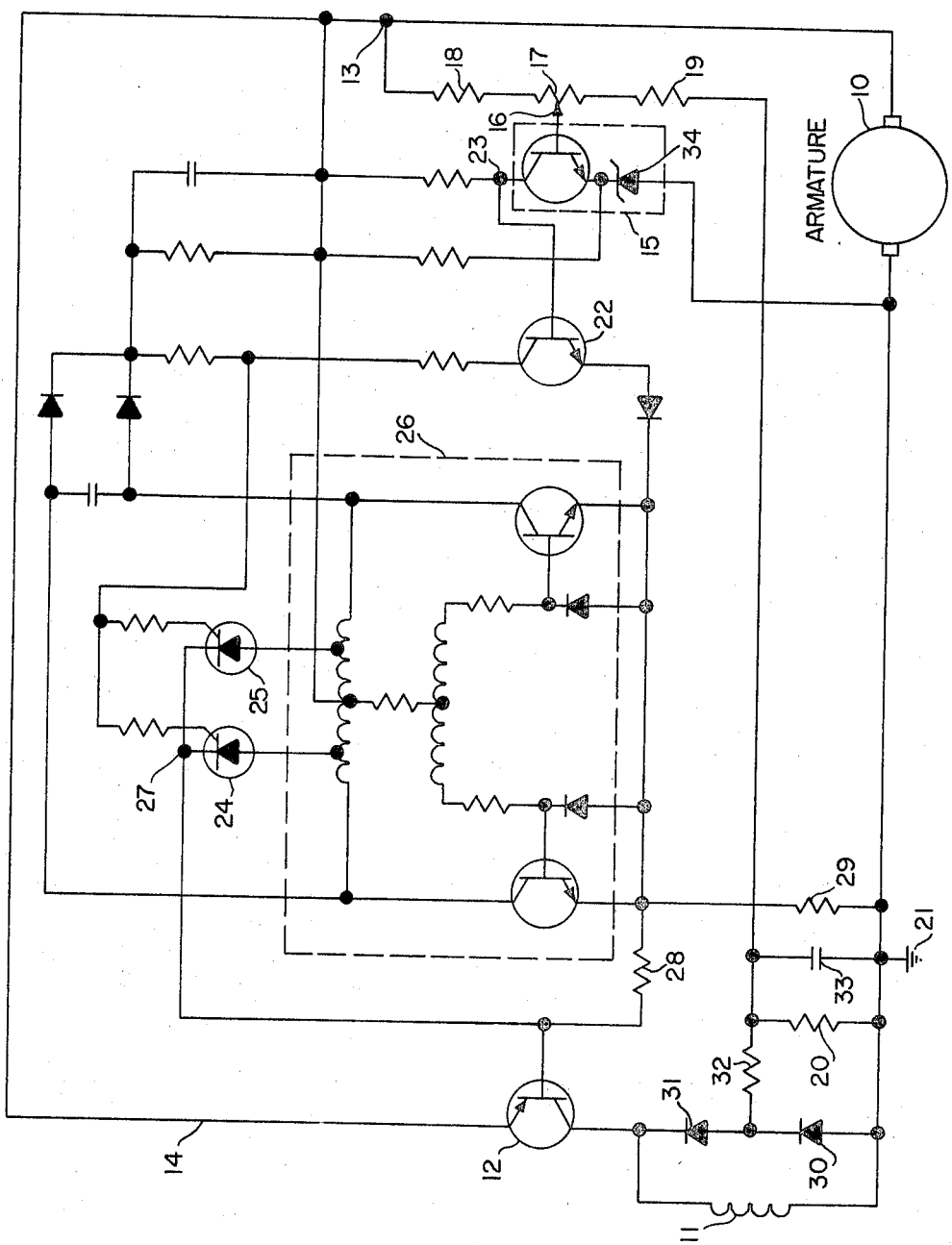

3,423,667
SWITCHING TYPE REGULATOR
David L. Lafuze, Waynesboro, Va., assignor to General Electric Company, a corporation of New York
Filed June 14, 1966, Ser. No. 557,480
U.S. Cl. 322—28   6 Claims
Int. Cl. H02h 7/06; H02p 9/00, 11/00

ABSTRACT OF THE DISCLOSURE

A voltage regulator for a DC generator includes a switching means in circuit with the generator's field winding for controlling the energization thereof in response to a sensed voltage derived from the generator's armature output. To avoid large drops in the generated voltage when the field winding is de-energized, a diode is placed in freewheeling connection with the field winding and the voltage developed thereacross subtracted from the sensed voltage to reclose the switching means faster.

---

The present invention relates to voltage regulators and more particularly to voltage regulators of the type used with self-excited, switched-field DC generators.

One type of DC generator which is commonly used in aircraft and other vehicles is a switched-field generator in which the power applied to the field winding is provided by tapping part of the output of the armature. To maintain the output of the armature at a constant level, switching circuits are employed to open or close the circuit between the armature and the field winding when the armature voltage exceeds or falls below predetermined magnitudes. The magnitude of the armature voltage is proportional to the power applied to the field winding. Therefore, the opening of the circuit results in a decrease in armature voltage whereas the closing results in an increase. Although prior art switching circuits may open or close the circuit when their input voltage varies by as little as 50 millivolts, the actual output of the generator may vary by as much as 1.8 volts. This is because such factors as the time constant of the field winding, the limited amount of power available for the field winding, commutator ripple, and the reactive characteristics of the load served by the generator tend to prevent rapid changes or reversals in the generated voltage.

It is a primary object of the present invention to provide a regulator circuit which prevents such wide variations in the magnitude of the output voltage of a generator.

To fulfill this object, there is provided a voltage regulator for use with a DC generator having its armature in circuit with its field winding. A switching means in the voltage regulator responds to a sensed voltage to open the circuit when the sensed voltage exceeds a predetermined maximum level and to close the circuit when the sensed voltage falls below a predetermined minimum level. The sensed voltage is provided by a biasing means having two alternate modes of operation. In the first mode of operation, the biasing means provides a sensed voltage directly indicative of the actual magnitude of the armature voltage. In the second mode of operation, the biasing means provides a sensed voltage indicative of a lower than actual armature voltage. Means are provided for causing the biasing means to assume its second mode of operation. These means include a resetting means which produces a constant voltage upon the opening of the circuit between the armature and the field winding. This constant voltage is impressed across the biasing means in subtractive relation to the voltages established therein to cause the biasing means to produce the sensed voltage indicative of the lower than actual magnitude of armature voltage. Since the switching circuit "sees" a lower than actual armature voltage, it recloses the circuit sooner and thus does not allow the output voltage to fall as far.

While the specification concludes with claims particularly pointing out and distinctly claiming that which is regarded as the present invention, the details of the invention along with its further objects and advantages may be more readily ascertained from the following detailed description when read in conjunction with the accompanying drawing in which:

The figure is a schematic diagram of a circuit representing one embodiment of the present invention.

Referring now to the figure, there will be seen a control circuit for a generator having an armature 10 which may be connected in circuit with a field winding 11 through a field-switching transistor 12 and a line 14. The conductive condition of the field switching transistor 12 is controlled by a circuit including a reference amplifier 15 which senses the voltage at an output terminal 13 of the armature 10. The sensed voltage is supplied to the reference amplifier 15 through an input tap 16 electrically connected to an impedance 17, connected in series with impedances 18, 19 and 20 which form a biasing circuit between the output terminal 13 of the armature and a ground terminal 21. The sensed voltage at the input tap 16 is compared to a reference voltage such as that which may be obtained by subjecting a Zener diode 34 to voltages in excess of its breakdown voltage. If the sensed voltage exceeds the reference voltage, the amplifier 15 conducts.

A transistor 22 having its base connected to a terminal 23 of the reference amplifier 15 controls the gate voltages applied to a pair of SCR's 24 and 25 which are connected to the output of a magnetically coupled oscillator 26, the details of which form no part of the present invention. The oscillator operates at a frequency of approximately 2,000 c.p.s. to provide power for the SCR's 24 and 25 which conduct alternately when the voltage applied at their gate terminals exceeds their firing voltages. Both SCR's have a common cathode connection in the base circuit of the field-switching transistor 12. The base circuit for the field-switching transistor 12 also includes biasing resistors 28 and 29.

Freewheeling diodes 30 and 31 connected in parallel with the field winding 11 provide a return path for induced currents which continue to flow in the field winding 11 after the circuit between the winding 11 and the armature 10 is opened by driving the field-switching transistor 12 into its nonconductive condition. The freewheeling diode 30 is connected in parallel with a pair of serially connected resistors 32 and 20, the latter of which is one of the series of resistors 17–20 in the input circuit. The impedance 20 is shunted by a high frequency capacitor 33 which shorts out any currents caused by high frequency noise.

The circuit described above operates in the following manner to maintain the output voltage of the generator near a constant value. When the voltage at the output terminal 13 is below a predetermined maximum value, the voltage sensed at tap 16 is directly indicative of the armature voltage. Assuming that the voltage developed by the generator armature 10 is below the maximum voltage, the voltage sensed at the tap 16 will be less than the reference voltage and the reference amplifier 15 will not conduct. Since the base voltage (at terminal 23) of transistor 22 is high, that transistor conducts and prevents the gate voltages applied to the SCR's 24 and 25 from rising above their firing level. With the SCR's 24 and 25 not conducting, no current flows through the base biasing circuit for the field-switching transistor 12 and that transistor remains in its conductive condition to maintain the electrical connection between the armature 10 and the field winding 11.

When the voltage sensed at tap 16 exceeds the reference voltage, the reference amplifier 15 switches into its conductive condition. The resulting drop in voltage at the terminal 23 biases the transistor 22 into its nonconducting condition, thereby raising the voltage at the gate terminals of the SCR's 24 and 25 above their firing level. When the SCR's 24 and 25 begin to alternately fire, the current flowing through the base biasing circuit of the transistor 12 causes that transistor to be switched into its nonconductive condition, thereby opening the circuit between the armature 10 and the field winding 11.

Due to the highly inductive nature of the field winding 11, the current in the winding continues to flow in the same direction even after the circuit opens. As this current flows through the freewheeling diodes 30 and 31, a constant voltage drop is established across each of these diodes due to the fact the voltage across a semiconductor device is relatively independent of the current flowing through that device. The constant voltage across the freewheeling diode 30 establishes a voltage drop across the resistors 20 and 32. The voltage drop across the resistor 20 is of an opposite polarity to the voltage drops established across the resistors 17-20 by the armature voltage and is therefore subtractive in relation to those voltage drops. The effect of the reverse voltage drop across the resistor 20 is to reduce the magnitude of the voltages sensed by the reference amplifier 15 through the tap 16. The voltage sensed by the reference amplifier 15 through the tap 16 is then no longer directly indicative of the output of the armature 10 as it is when the circuit between the armature 10 and the field winding is closed. Instead, the reference amplifier "sees" a lower than actual armature voltage. This causes the reference amplifier 15 to sense the predetermined minimum voltage so as to switch the transistor 12 back into its conducting condition more rapidly than if there were no reverse voltage applied across the resistor 20.

Since the transistor 12 becomes nonconducting at the same maximum level of armature voltage but returns to its conducting condition more rapidly than if there were no reverse voltage across resistor 20, it will be seen that the addition of diode 30 effectively increases the switching rate of the circuit. This increased switching rate prevents extreme variations in the magnitude of the armature voltage. To vary the switching rate, the relative magnitudes of resistors 32 and 20 may be varied to cause corresponding variations in the proportion of the voltage across diode 30 which appears across resistor 20.

While there has been described at present what is thought to be a preferred embodiment of the present invention, modifications and variations may occur to those skilled in the art. Therefore, it is intended that the appended claims shall cover all such variations and modifications as fall within the true spirit and scope of the invention.

What I claim as new and desire to secure by Letters Patent of the United States is:

1. A voltage regulator for use with a DC generator having its armature in circuit with its field winding, said voltage regulator including switching means responsive to a sensed voltage for controlling the circuit between the armature and the field winding, biasing means for producing the sensed voltage for said switching means, said biasing means being alternately operable in a circuit-opening mode wherein the sensed voltage is directly indicative of the actual magnitude of the armature voltage or in a circuit-closing mode wherein the sensed voltage is indicative of a magnitude of armature voltage lower than the actual magnitude, resetting means energized upon the opening of the circuit between the armature and the field winding so as to produce a constant voltage; and means for impressing said constant voltage across said biasing means in subtractive relation to the voltages established therein by the armature voltage to cause said biasing means to assume its circuit-closing mode of operation.

2. A voltage regulator as recited in claim 1 wherein said resetting means includes a pair of serially-connected diodes connected across said field winding to conduct the current which flows in the field winding when the circuit between the armature and the field winding is opened.

3. A voltage regulator as recited in claim 2 wherein said biasing means includes a plurality of serially-connected impedances.

4. A voltage regulator as recited in claim 3 wherein said means for impressing said constant voltage developed across a first one of said diodes in said resetting means comprises an impedance connected in series with said plurality of serially-connected impedances of said biasing means and in parallel with said first one of said diodes.

5. A voltage regulator for use with a DC generator having its armature in circuit with its field winding, said voltage regulator including switching means responsive to a sensed voltage and having a single active element in series connection with the armature and the field winding for controlling the electrical connection therebetween, biasing means for producing the sensed voltage for said switching means, said biasing means comprising a plurality of serially-connected impedances, a first diode having its cathode connected to a terminal common to said single active element and one end of the field winding, a second diode having its cathode connected to the anode of said first diode and its anode connected to the other end of the field winding, and one or more serially-connected resistors connected across said second diode, at least one of said resistors being connected in series with said plurality of serially-connected impedances in said biasing means.

6. In a self-excited generator, a voltage regulator comprising switch means intercoupling the armature and field of said generator, bias means coupled to said armature and including a voltage reference to control the on-off conduction cycle of said switch means in accordance with the deviation of the armature voltage from said voltage reference, bias adjust means coupled to said generator field and activated when said switch means is turned off to develop a voltage of opposite polarity to said armature voltage, and means coupling said voltage of opposite polarity to said bias means to shorten the off time of said switch means so that the on-off correction period of said generator is reduced.

References Cited
UNITED STATES PATENTS

| | | | |
|---|---|---|---|
| 2,746,006 | 5/1956 | Hill | 322—70 |
| 3,323,036 | 5/1967 | Runyan | 322—28 |
| 3,333,176 | 7/1967 | Cronin et al. | 322—73 X |

BENJAMIN DOBECK, *Primary Examiner.*

H. HUBERFELD, *Assistant Examiner.*

U.S. Cl. X.R.

322—36, 70, 73, 79